Reissued May 28, 1935

Re. 19,594

UNITED STATES PATENT OFFICE 19,594

PROCESS OF MANUFACTURING TITANIUM OXIDE SUITABLE FOR USE AS A PIGMENT

Karl Leuchs, Berlin-Zehlendorf, Germany, assignor, by mesne assignments, to Krebs Pigments & Color Corporation, a corporation of Delaware No Drawing. Original No. 1,853,626, dated April 12, 1932, Serial No. 149,800, November 20, 1926. Application for reissue April 6, 1934, Serial No. 719,405. In Germany November 27, 1925

14 Claims. (Cl. 23—202)

My invention relates to improvements in the process of manufacturing titanic oxide suitable for use as a pigment. When rendering titanium ores such as ilmenite or rutile soluble by means of sulfuric acid or bisulphate of sodium ($NaHSO_4$) and dissolving the product in water, solutions are obtained from which titanic oxide ($TiO_2$) can be satisfactorily precipitated only by heating under pressure and at high temperature or, under atmospheric pressure, by largely diluting the solutions. However, particularly in the last-named process, much iron is precipitated, the dilution causing dissociation of the iron compounds resulting in the precipitation of the iron.

I have discovered that a better result is obtained when first transforming the titanium sulphate obtained by dissolving the ore into titanium hydroxide, separating the precipitated hydroxide, and redissolving the same in sulfuric acid. Even at high concentrations of sulfuric acid which do not permit precipitation of the iron oxide from the said solutions of the ores, the titanic oxide is almost completely precipitated from the solution containing the titanium hydroxide at the temperature of boiling water and under atmospheric pressure.

Thus, in my improved process the concentration of the sulfuric acid and the titanium compound may be such that the hydrolysis and the precipitation of iron is prevented. Therefore my process consists in first rendering the titanium ore soluble by means of sulfuric acid or bisulphate of sodium, dissolving the product in water, transforming the sulphate of titanium into the hydroxide by adding a suitable base, preferably magnesium oxide distributed in water, separating the titanium hydroxide which still contains a high proportion of iron, redissolving the impure hydroxide in sulfuric acid of suitable concentration, and finally precipitating the titanic oxide by heating the solution at the temperature of boiling water and under atmospheric pressure.

I have found that it is not necessary to precipitate all the hydroxide from the solution of the titanium ore, and that it is sufficient to precipitate only a part thereof, and to dissolve the precipitate in the other part of the solution of the ore. Thus on the one hand a high concentration of titanic oxide in the solution is obtained, so that the solution to be heated is comparatively small, and on the other hand the solutions can be so concentrated that the sulfuric acid set free by the hydrolysis of the titanium sulphate is sufficient to prevent the hydrolysis of the iron compound.

*Example.*—100 kilogrammes of ilmenite are made soluble by the proper amount of sulfuric acid, and water is added so that a solution of about 400 liters is obtained. The $Fe^{+++}$ is reduced to $Fe^{++}$, by any known process. A part of the iron sulphate is crystallized at normal or reduced temperature. Now a part of the solution, say about 200 liters, is precipitated by means of so much of a suitable base preferably oxide of magnesium distributed in water that all the sulfuric acid except that present in the $FeSO_4$ is neutralized. The precipitate is separated in a filtering press and redissolved in the 200 litres of the remaining solution of the ore.

Thus a solution is produced which contains titanic-oxide and sulfuric acid substantially at the ratio of one molecule of titanic-oxide and one molecule of sulfuric acid, while in the original solution obtained by rendering the ore soluble by means of sulfuric acid and dissolving the same in water the said compounds are at the rate of two molecules of sulfuric acid and one molecule of titanic-oxide. The relative amount of titanic-oxide is increased and the relative amount of iron is reduced accordingly. The solution thus obtained is heated at a temperature of about 100° C., whereby about 90% of the titanic oxide is precipitated, the precipitate being free of iron, provided that the concentration of the sulfuric acid, bound to titanium, in the last named solution is not less than about 18%.

The precipitate is pulverulent, and can be easily filtered, and, after being further treated, it is a high class white pigment.

When adding more sulfuric acid to the solution the output is slightly reduced, but in any case it is satisfactory, even if the concentration of the sulfuric acid is higher than that contained in the solutions of the ore which at a temperature of 100° C. do not result in precipitation. Small amounts of sulfuric acid which are always present in the precipitate can be removed by ignition, by means of ammonia, or by other known processes.

The mother liquor of the precipitating process can be again concentrated or regenerated by means of concentrated sulfuric acid, and used for rendering soluble a new quantity of ore.

I claim:

1. The herein described process of manufacturing titanic-oxide from titanic ores, which consists in rendering titanium ore soluble by means of sulfuric acid, dissolving the product in water, precipitating titanium hydroxide by means of magnesium-oxide, separating the precipitate, dissolving the precipitate in sulfuric acid, and heating the solution.

2. The herein described process of manufacturing titanic-oxide from titanium ores, which consists in rendering titanium ore soluble by means of sulfuric acid, dissolving the product in water, precipitating titanium hydroxide by means of magnesium-oxide, separating the precipitate, dissolving the precipitate in so much sulfuric acid that the concentration of the free acid and that bound to the titanium is not less than about 18% and heating the solution.

3. The herein described process of manufacturing titanic-oxide from titanium ores, which consists in rendering titanium ore soluble by means of sulfuric acid, dissolving the product in water, precipitating titanium hydroxide from a part of the solution by means of magnesium-oxide, separating the precipitate, dissolving the precipitate in the remainder of the solution of the ore, and heating the solution.

4. The herein described process of manufacturing titanic-oxide from titanic ores, which consists in rendering titanium ore soluble by means of sulfuric acid, dissolving the product in water, precipitating titanium hydroxide by means of magnesium-oxide, separating the precipitate, dissolving the precipitate in so much sulfuric acid that sulfuric acid and titanic-oxide are substantially at the ratio of one molecule of sulfuric acid and one molecule of titanic-oxide and that the concentration of the sulfuric acid is not less than about 18%, and heating the solution.

5. The herein described process of manufacturing titanic-oxide from titanium ores, which consists in rendering titanium ore soluble by means of sulfuric acid, dissolving the product in water, precipitating titanium hydroxide from a part of the solution by means of magnesium-oxide, separating the precipitate, dissolving the precipitate in the remainder of the solution of the ore so that titanic-oxide and sulfuric acid are in the solution at the ratio of one molecule of titanic-oxide and one molecule of sulfuric acid and the solution contains not less than about 18% of $SO_4$ ions bound to titanic-oxide, and heating the solution.

6. The herein described process of manufacturing titanic-oxide from titanium ores, which consists in rendering titanium ore soluble by means of sulfuric acid, dissolving the product in water, precipitating titanium hydroxide from a part of the solution by means of a base, separating the precipitate, dissolving the precipitate in the remainder of the solution of the ore so that titanic-oxide and sulfuric acid are in the solution at the ratio of one molecule of titanic-oxide and one molecule of sulfuric acid and the solution contains not less than about 18% of $SO_4$ ions bound to titanic-oxide, and heating the solution.

7. In a process of manufacturing titanic oxide from a titanium ore the steps which comprise rendering titanium ore soluble by means of sulfuric acid, dissolving the product in water, dissolving titanium hydroxide in the so obtained solution, the amount of said titanium hydroxide dissolved in said solution being such as to substantially increase the ratio of titanium to $SO_4$ ions present in the solution, and heating this latter solution to precipitate titanic oxide therefrom.

8. In a process of manufacturing titanic oxide from a titanium ore the steps which comprise rendering titanium ore soluble by means of sulfuric acid, dissolving the product in water, precipitating titanium hydroxide from said solution by means of a base, dissolving said precipitate in a titanium solution obtained by rendering a titanium ore soluble by means of sulfuric acid, the amount of said precipitate dissolved in said solution being such as to substantially increase the ratio of titanium to $SO_4$ ions present in the solution and heating the so obtained solution to precipitate titanic oxide therefrom.

9. The process of claim 7 in which the titanium solution in which titanium hydroxide is dissolved contains an iron salt.

10. The process of claim 8 in which the titanium solutions obtained by rendering titanium ore soluble by means of sulfuric acid contain an iron salt.

11. The process of claim 7 in which the titanium solution before heating contains not less than about 18% $SO_4$ ions bound to titanic oxide.

12. The process of claim 8 in which the titanium solution before heating contains not less than about 18% $SO_4$ ions bound to titanic oxide.

13. The process of claim 7 in which the titanium solution in which titanium hydroxide is dissolved contains an iron salt and in which the titanium solution before heating contains an amount of $SO_4$ ions sufficient to prevent precipitation of substantial amounts of iron compounds on heating the solution.

14. The process of claim 8 in which the titanium solutions obtained by rendering titanium ores soluble by means of sulfuric acid contain an iron salt and in which the titanium solution before heating contains an amount of $SO_4$ ions sufficient to prevent precipitation of substantial amounts of iron compounds on heating the solution.

KARL LEUCHS.